(12) United States Patent
Gillis

(10) Patent No.: US 12,356,111 B2
(45) Date of Patent: *Jul. 8, 2025

(54) VIDEO DEINTERLACER WITH INTRAFRAME AND INTERFRAME BLENDING

(71) Applicant: Sling TV L.L.C., Englewood, CO (US)

(72) Inventor: Gregory Nelson Gillis, Riverton, UT (US)

(73) Assignee: Sling TV L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,642

(22) Filed: Apr. 19, 2024

(65) Prior Publication Data
US 2024/0297956 A1 Sep. 5, 2024

Related U.S. Application Data

(63) Continuation of application No. 18/149,573, filed on Jan. 3, 2023, now Pat. No. 11,997,416.

(60) Provisional application No. 63/305,228, filed on Jan. 31, 2022.

(51) Int. Cl.
*H04N 7/01* (2006.01)
*H04N 21/2343* (2011.01)

(52) U.S. Cl.
CPC .......... *H04N 7/01* (2013.01); *H04N 21/2343* (2013.01)

(58) Field of Classification Search
CPC ...... H04N 7/01; H04N 7/012; H04N 21/2343; H04N 7/0137; H04N 7/014; H04N 7/0117; H04N 7/0135
USPC .......................... 348/441, 48, 452, 451, 459
See application file for complete search history.

(56) References Cited

U.S. PATENT DOCUMENTS

2002/0150159 A1   10/2002   Zhong
2010/0283892 A1   11/2010   Zhou et al.

*Primary Examiner* — Sherrie Hsia
(74) *Attorney, Agent, or Firm* — KW Law, LLP

(57) ABSTRACT

The various embodiments described herein provide systems, devices and/or processes to improve the deinterlacing of interlaced video content. Specifically, the various embodiments described herein facilitate the deinterlacing of video content by using both intraframe and interframe pixel prediction values to generate replacement pixel values to be used in the resulting progressive scan video. Specifically, the embodiments described herein generate both intraframe pixel prediction values and intraframe pixel prediction values for each pixel in the interlaced video that is to be replaced. The intraframe pixel prediction values and intraframe pixel prediction values are then blended together to generate the replacement pixel values that are used in the progressive scan video. In one embodiment, the blending of intraframe pixel prediction values and intraframe pixel prediction values is based at least in part by estimations of motion in the video about the pixel being replaced.

20 Claims, 10 Drawing Sheets

INTRA PRED VALUE CALCULATIONS FOR PIXEL 3F

500

VIDEO DEINTERLACER WITH INTRAFRAME AND INTERFRAME BLENDING

CROSS-REFERENCE TO RELATED APPLICATIONS

This application claims priority to U.S. patent application Ser. No. 18/149,573 filed on Jan. 3, 2023, now U.S. Pat. No. 11,997,416, and entitled "VIDEO DEINTERLACER WITH INTRAFRAME AND INTERFRAME BLENDING," which claims priority to U.S. Provisional Patent Application No. 63/305,228 filed on Jan. 31, 2022, and entitled "VIDEO DEINTERLACER WITH INTRAFRAME AND INTERFRAME BLENDING," both of which are incorporated by reference herein.

TECHNICAL FIELD

The following discussion generally relates to video processing systems. More particularly, the following discussion relates to deinterlacing video.

BACKGROUND

Video content from many traditional video sources is commonly recorded and stored in the form of interlaced video. For example, traditional television and cable video has been typically recorded, processed and transmitted as interlaced video. In general, interlaced video is a video format where each frame of video is captured and stored as two interlaced fields separated in time, commonly referred to as top and bottom fields or as even and odd fields. In such examples the different fields provide alternating lines of video that are updated at different times. For example, the top or even field can provide the video for even lines of video content (e.g., 0, 2, 4, 6, etc.) while the bottom or odd field provides the odd lines of video content (e.g., 1, 3, 4, 5, etc.). In such an example the top field (i.e., the even lines) is drawn first on the video screen first, followed in time by the bottom field (i.e., the odd lines).

As one specific example, 60i video is interlaced video that contains 60 interlaced fields (e.g., 30 top fields, 30 bottom fields) per second of video, with the top and bottom fields separated in time by 1/60 of a second. In 60i video the top field (i.e., the even lines) is drawn first on the video screen first, and the bottom field (i.e., the odd lines) are drawn 1/60 of a second later. Thus, taken together the 60 interlaced fields in 60i interlaced video provide 30 frames of video per second.

In contrast with interlaced video, progressive video is a video format where the lines of a video frame are drawn on the screen in sequence (i.e., 0, 1, 2, 3, etc.). Thus, in 30P progressive scan video frames are drawn in sequence each 1/30 of a second. Likewise, in 60P progressive scan video frames are drawn in sequence each 1/60 of a second.

There is a general need to convert interlaced video to progressive scan video, a process generally known as deinterlacing. For example, there is a continuing need to convert traditional television and cable video that was recorded, processed and originally transmitted as interlaced video to progressive scan video for transmission over the internet where it can be displayed on a wide variety of different internet connected devices. It should be noted that merely merging the top fields and bottom fields together to form one progressive scan frame would result in unacceptable video quality due to the time difference of the two frames. Therefore, previous techniques have used more elaborate processes for deinterlacing. Unfortunately, previous techniques used for deinterlacing video can result in significantly degraded video quality. For example, previous techniques for deinterlacing video can result in noticeable video artifacts that are distracting to the viewer.

Thus, there is a continuing need for improved techniques for video deinterlacing that can be used to convert interlaced video to progressive scan video while providing good video quality.

BRIEF SUMMARY

The various embodiments described herein provide systems, devices and/or processes to improve the deinterlacing of interlaced video content. Specifically, the various embodiments described herein facilitate the deinterlacing of video content by using both intraframe and interframe pixel prediction values to generate replacement pixel values to be used in the resulting progressive scan video. Specifically, the embodiments described herein generate both intraframe pixel prediction values and intraframe pixel prediction values for each pixel in the interlaced video that is to be replaced. The intraframe pixel prediction values and intraframe pixel prediction values are then blended together to generate the replacement pixel values that are used in the progressive scan video. In one embodiment, the blending of intraframe pixel prediction values and intraframe pixel prediction values is based at least in part by estimations of motion in the video about the pixel being replaced.

This use of both intraframe pixel prediction values and intraframe pixel prediction values and the blending of those values based in part on estimations of motion can result in improved video quality in the generated progressive scan video. Specifically, the amount of artifacts noticeable to the viewer can be greatly reduced. Also, the peak signal-to-noise ratio (PSNR) can be significantly increased.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

DETAILED DESCRIPTION

The following detailed description is intended to provide various examples, but it is not intended to limit the invention or the application and uses of the invention. Furthermore, there is no intention to be bound by any disclosure presented in the preceding background or the detailed description.

The various embodiments described herein provide systems, devices and/or processes to improve the deinterlacing of interlaced video content. Specifically, the various embodiments described herein facilitate the deinterlacing of video content by using both intraframe and interframe pixel prediction values to generate replacement pixel values to be used in the resulting progressive scan video. Specifically, the embodiments described herein generate both intraframe pixel prediction values and interframe pixel prediction values for each pixel in the interlaced video that is to be replaced. The intraframe pixel prediction values are generated from a kernel of pixel values within the same frame as the pixel being replaced. The interframe pixel prediction values are generated from at least one pixel value from a different frame. The intraframe pixel prediction values and interframe pixel prediction values are then blended together to generate the replacement pixel values that are used in the progressive scan video.

This use of both intraframe pixel prediction values and intraframe pixel prediction values and the blending of those values based in part on estimations of motion can result in improved video quality in the generated progressive scan video. Specifically, the amount of artifacts noticeable to the viewer can be greatly reduced. Also, the peak signal-to-noise ratio (PSNR) can be significantly increased.

Figure 1:
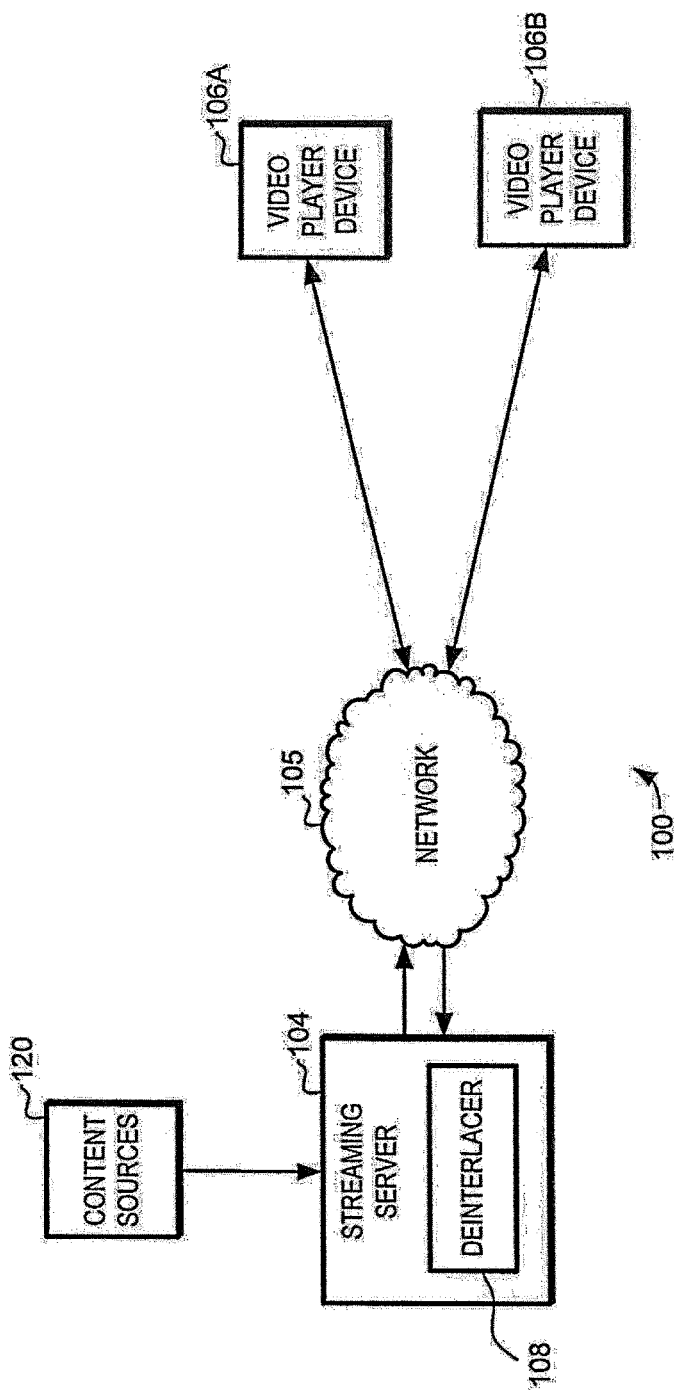
FIG. 1 is a diagram of an example video streaming system that includes a deinterlacer and a plurality of video player devices in accordance with the embodiments described herein.

Turning now to the drawings and with initial reference to FIG. 1, a video streaming system 100 suitably includes a streaming server 104 and a plurality of video player devices 106A-b. In general, the streaming server 104 receives video content from one or more content sources 120, and transmits that video content through the network 105 to the video player devices 106A-b in the form of a video stream that can be received, processed, and displayed at the video player devices 106A-b. In accordance with the embodiments described herein, the streaming server 104 includes or is coupled to a deinterlacer 108.

In general, the content sources 120 can be any type of video content source, including media providers, content aggregators or distributors such as a cable television system operator, a direct broadcast satellite (DBS) system operator, or simply a network service provider or the like. These content sources 120 can provide the video content to the streaming server 104 in any suitable form and by any suitable technique. For example, the video content can be provided via satellite, fiber optic or any other conventional wireless or physical media for transmitting signals. The transmitted signals can be received, demodulated and decoded as desired by any appropriate receiver to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the video player devices 106A-B. For example, the streaming server 104 can transmit an encoded video stream via a content delivery network (CDN) for distribution on network 105 (e.g., the Internet) as part of an RSDVR, VOD or other video streaming service. And as was described above, this can include using the deinterlacer 108 to deinterlace video content and generate progressive scan video for transmission.

As a specific example, the content sources 120 can provide some or all of the video content as 60i interlaced video that contains 60 interlaced fields per second of video. As was described above, in 60i video the top field (i.e., the even lines) are typically drawn first on the video screen first, and the bottom field (i.e., the odd lines) are typically drawn ⅟₆₀ of a second later. Thus, taken together the 60 interlaced fields in 60i interlaced video provide 30 frames of video per second.

In a typical embodiment the streaming server 104 would determine what content is in the form of interlaced video. The streaming server 104 can then utilize the deinterlacer 108 to selectively deinterlace that video before it is encoded and transmitted to the video player devices 106A-B. For example, the deinterlacer 108 can be used to generate 30P or 60P progressive scan video from the 60i interlaced video. Again, in progressive scan video the lines of a video frame are drawn on the screen in sequence (i.e., 0, 1, 2, 3, etc.). Thus, in 30P progressive scan video frames are drawn in sequence every ⅟₃₀ of a second. Likewise, in 60P progressive scan video frames are drawn in sequence every ⅟₆₀ of a second. In either case these progressive scan video streams can then be transmitted to the video player devices 106A-b.

It should again be noted that merely merging the top field and bottom fields together to form one progressive scan frame would result in unacceptable video quality due to the time difference of the two frames. For example, in a 60i interlaced video the top field is separated in time from the bottom field by ⅟₆₀ of the second. Simply merging these two fields together to form one progressive scan frame would result in unacceptable amounts of artifacts in the final video.

In general, each of the video player devices 106A-B includes a combination of hardware and/or software configurable to receive, process, and play the video streams received from the streaming server 104. As examples, each of the video player devices 106A-B can be implemented to include a streaming application stored in memory and being executed by a suitable processor. As some specific examples, each of the video player devices 106A-B can be implemented with any suitable computing device, including laptops, tablets, virtual reality (VR) devices, and mobile communication devices (e.g., smart phones). Such devices may include an integrated display screen, or may be coupled to a separate display screen.

In one example embodiment, the streaming server 104 and/or deinterlacer 108 are implemented to perform one or more automated processes to facilitate the deinterlacing of content received from the content sources 120. In general, these automated processes facilitate the deinterlacing of video content by using both intraframe and interframe pixel prediction values to generate replacement pixel values to be used in the resulting progressive scan video. Specifically, the automated processes described herein generate both intraframe pixel prediction values and intraframe pixel prediction values for each pixel in the interlaced video that is to be replaced. The intraframe pixel prediction values and intraframe pixel prediction values are then blended together to generate the replacement pixel values that are used in the progressive scan video. In one embodiment, the blending of intraframe pixel prediction values and interframe pixel prediction values is based at least in part on estimations of motion in the video about the pixel being replaced.

In one embodiment, an automated process for converting an interlaced video to a progressive scan video is provided. In this embodiment the automated process is executable by a computing system that includes a processor and a memory coupled to the processor. This automated process comprises copying a first plurality of pixel values from a first field to a new progressive scan frame in the progressive scan video for each interlaced frame in the interlaced video. The automated process further comprises, for each pixel in a second plurality of pixels from a second field, determining an intraframe pixel prediction value; determining an interframe pixel prediction value; determining a replacement pixel value as a blending of the interframe prediction value and the intraframe prediction value; and copying the replacement pixel value to the new progressive scan frame.

In one embodiment, the blending of intraframe pixel prediction values and interframe pixel prediction values is based at least in part on estimations of motion in the video about the pixel being replaced. For example, in one embodiment a motion strength value is generated and used to determine the percentages of interframe prediction value and intraframe prediction value used in determining a replacement pixel value. In such an embodiment motion strength value can be determined at least in part based on pixel pairs from a previous frame, a current frame, and a next frame. In one specific embodiment the difference of averages of these pixel pairs can be used to generate the motion strength value.

In one embodiment the motion strength value is used to determine a blending factor that is used in blending the intraframe pixel prediction values and interframe pixel prediction values. For example, the blending factor can be determined by comparing the motion strength value to one or more threshold values. The blending factor can be based in part on the motion strength value when the motion strength value is between the threshold values, and can be set to constant values (e.g., 1 or 0) when beyond the threshold values.

In one embodiment the blending factor is applied to intraframe pixel prediction pixel values and the interframe pixel prediction values, and the result is clamped to an acceptable range of values to determine the final replacement pixel value. For example, the final replacement pixel value can be clamped to a range of 16 and 235 or 0 and 255 for 8-bit video.

A variety of techniques can be used to determine the intraframe pixel prediction values and interframe pixel prediction values. In general, the intraframe pixel prediction values are generated by interpolating a kernel of pixel values from within the same frame. In contrast, the interframe pixel prediction values are generated using at least one pixel value from a different frame. A blending of these different intraframe pixel prediction values and the interframe pixel prediction values is then used to generate the replacement pixel values.

In one specific embodiment, a cubic spline interpolation of a kernel of pixel values is used to generate the intraframe pixel prediction value. For example, the kernel of pixel values can correspond to two pixels above and two pixels below the pixel being replaced. The cubic spline interpolation of the values from the two pixels above and two pixels below results in an intraframe prediction value that be blended and used to generate the replacement pixel value. A detailed example of such a cubic spline interpolation will be discussed in greater detail below with reference to FIG. 3.

In another embodiment intraframe pixel prediction values are determined by first generating prediction scores, where the prediction scores are indicative of motion in a corresponding direction. A kernel of pixel values can then be selected using the prediction scores, and that selected kernel of pixel value used to generate the intraframe pixel prediction value. As a specific example, the kernel of pixel values having the lowest score can be selected and used to generate the intraframe pixel prediction value.

In another embodiment, a search for a local minimum among a plurality of prediction scores is performed. In such an embodiment a first plurality of kernels of pixel values is used to generate prediction scores, where each plurality of prediction scores indicative of motion in a corresponding direction. The prediction scores are then searched to locate a local minimum in at least two directions, and the overall minimum prediction score is used to select a kernel of pixels used for generating the intraframe pixel prediction value.

In such an embodiment the intraframe pixel prediction value is then calculated from a kernel of pixel values selected from a second plurality of kernels of pixel values, with the selected kernel of pixel values corresponding to the local minimum among the plurality of prediction scores.

In another embodiment, the intraframe pixel prediction value is determined by calculating a plurality of prediction scores using differences in pixel pair values from each of a first plurality of kernels of pixel values, where the pixel pair values correspond to pixel pairs aligned in different directions such that each pixel plurality of prediction scores is indicative of motion in a corresponding direction. A kernel of pixel values from a second plurality of kernels of pixel values is then selected based on the plurality of prediction scores, and the intraframe pixel prediction value is calculated using an average of the selected kernel of pixel values.

As noted above, a variety of techniques can be used to determine the interframe pixel prediction values. In general, the interframe pixel prediction values can be generated using at least one pixel value from a different frame. In one embodiment, the determining the interframe pixel prediction value comprises determining a median of a previous frame pixel value, a current frame pixel value, and an average of a plurality of current frame pixel values. In this embodiment the interframe pixel prediction value can then be selected based on the determined median. In such an embodiment the interframe pixel prediction value can be determined by performing a cubic spline interpolation on a kernel of pixel values from the first field responsive to the average of the plurality of current frame pixel values being the determined median.

Figure 2:
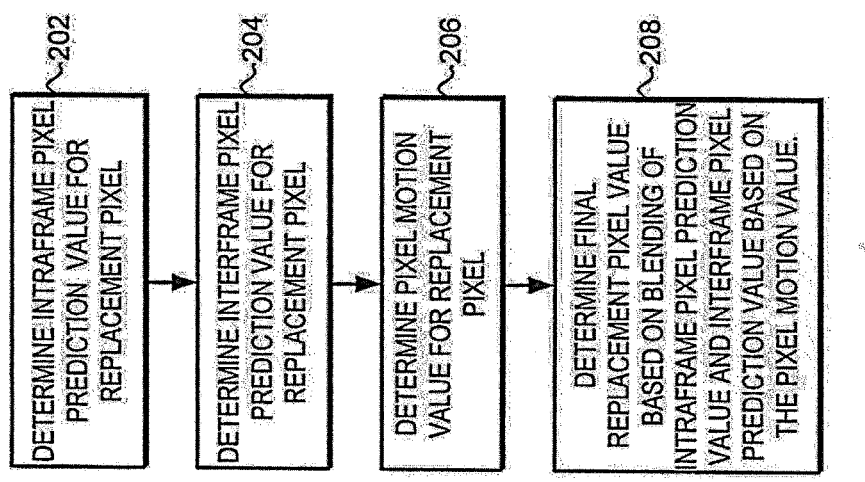
FIG. 2 is a flowchart showing a method for generating replacement pixel values in accordance with the embodiments described herein.

Turning now to FIG. 2, a method 200 for generating replacement pixel values is illustrated. The method 200 is an example of the type of methods that can be performed by a deinterlacer (e.g., deinterlacer 108 of FIG. 1) in accordance with the embodiments described herein. In general, the method 200 uses both intraframe and interframe pixel prediction values from an interlaced video to generate replacement pixel values for the new progressive scan video being generated. This method 200 is thus typically performed for each pixel in the progressive scan video that is to be replaced with a generated pixel.

As was described above, interlaced video typically includes two interlaced fields for each frame of video. These interlaced fields are commonly referred to as "top" and "bottom" fields, where the two different fields provide alternating lines of video that are drawn on the screen at different times. For example, the top field can include the pixels for the even lines of video content (e.g., 0, 2, 4, 6, etc.) while the bottom field includes the pixels for the odd lines of video content (e.g., 1, 3, 4, 5, etc.). Again, in a typical example the top field (i.e., the even lines) is drawn first on the display screen, followed in time by the bottom field (i.e., the odd lines).

In one embodiment, the deinterlacer can be implemented to generate the progressive scan video from interlaced video by copying some pixels to the new progressive scan video, and generating replacement pixel values for other pixels. For example, in some embodiments, the pixel values from a first field may be copied to a progressive scan frame with relatively little processing, while the pixels from the second field are generated as replacement pixel values using method 200.

For example, the pixel values from the top field (e.g., the even lines) or a bottom field (e.g., the odd lines) can be copied to corresponding lines in the new progressive scan frame. Replacement pixel values for the remaining lines of the new progressive scan frame are then generated using the method 200. The result is a complete frame of pixels, where the frame includes the lines of pixels used to be displayed in a progressive scan while providing good video quality. This process would then be repeated for each new progressive scan frame that is generated for the video.

It should be noted that method 200 can be used to generate progressive scan videos of different frame rates. For example, the method 200 can be used to generate 30P progressive scan video from 60i interlaced video. In this embodiment the method 200 would be used on alternating fields of pixels (e.g., top or bottom fields) with the other fields would be copied with limited addition processing to the new progressive scan frame. Thus, one progressive scan frame is generated for each set of two interlaced fields, resulting in 30P progressive scan video.

But in another embodiment the method 200 can be used to generate 60P progressive scan video from 60i interlaced video. In this embodiment the method 200 would be used on each field (i.e., both top and bottom fields) and to generate two different progressive scan frames. Stated another way, each field is both copied to a new progressive scan frame and used to generate replacement pixel values, resulting in 60P final progressive scan video.

It should also be noted that it may not be desirable to perform method 200 for new pixels being generated for each progressive scan frame. For example, in some cases it may be desirable to use simplified methods to generate replacement pixel values for pixels near the outer perimeter of the frame. For example, for those pixels on the edge a smaller number of pixels can be used to generate replacement values. And in some cases it may not be desirable to compute both intraframe and interframe replacement values for pixels at or near the edge.

In some embodiments, it may be desirable to implement the deinterlacer to have multiple operational modes, where one or more operational modes is provided for use in deinterlacing video with relatively low motion content, and where one or more operational modes is provided for use in deinterlacing video with relatively high motion content. An operator of the deinterlacer can then select the mode used when deinterlacing particular videos. And as will be described in greater detail below, the deinterlacer can implement method 200 differently based on the selected mode. Specifically, the example of FIG. 3 is particularly applicable to deinterlacing video with relatively low amounts of motion, while the example of FIGS. 4A, 4B, 5A, and 5B typically consume more processing resources but can better deinterlace video with relatively high motion.

The first step 202 is to determine an intraframe pixel prediction value for the replacement pixel. In general, this step is performed using one or more kernels of pixels from within the same frame for which the replacement pixel is being generated. Specifically, the intraframe pixel prediction value can be generated by interpolating a kernel of pixel values from within the same frame. In one specific embodiment, a cubic spline interpolation of a kernel of pixel values is used to generate the intraframe pixel prediction value.

Figure 3:
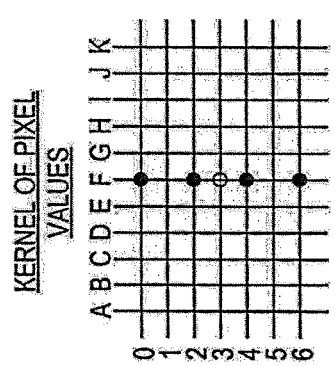
FIG. 3 is a schematic diagram of a kernel of pixel values in accordance with an embodiment described herein.

Turning now to FIG. 3, a schematic view of an example kernel 300 of pixel values that can be used for determining intraframe pixel prediction value is illustrated. Specifically, FIG. 3 shows a portion of an interlaced frame of pixel values with both the top field (e.g., the even lines of pixels) and the bottom field (e.g., the odd lines of pixels) are illustrated together, although as described above, these different fields of the interlaced frame would actually be transmitted and displayed at different times. Thus, in this example lines 0, 2, 4, and 6 would correspond to one field in the interlaced frame, while lines 1, 3 and 5 would correspond to the other field.

In this illustrated example, new progressive scan frames are being generated by 1) copying pixel values from the top field of interlaced frame to the new progressive scan field, and 2) generating new replacement pixel values for the pixel values from the bottom field. Again, in this illustrated example, the top field corresponds to the even lines and the bottom field corresponds to the odd lines, although this is just one non-limiting example. Thus, in this example, the pixel values for the even lines would be copied to the new progressive scan frame, and new replacement pixel values would be generated for the odd lines in the new progressive scan frame.

In the specific example of FIG. 3, an intraframe pixel prediction value is being generated that corresponds to the pixel location at line 3 and column F. This pixel location can be expressed as 3F, and the location corresponding to this pixel is illustrated as an open circle in FIG. 3. A kernel of pixel values from within the same frame is being used to generate this intraframe pixel prediction value, with those corresponding pixels illustrated as closed circles. Specifically, in this example pixel values corresponding to 0F, 2F, 4F and 6F are being used to generate the intraframe pixel prediction value for the pixel at 3F.

In this example the kernel of pixel values corresponds to two pixels above (0F, 2F) and two pixels below (4f, 6F) the pixel being replaced. Again, this is just one non-limiting example. Notably, these pixels are selected from the top frame and are being used to generate a replacement pixel value for lines originally in the bottom frame.

In one specific embodiment, a cubic spline interpolation of the kernel of pixel values is used to generate the intraframe pixel prediction value. In this example, a cubic spline interpolation of the pixel values from 0F, 2F, 4F and 6F is being used to generate the intraframe pixel prediction value for the pixel at 3F. In general, spline interpolation is a type of interpolation that uses piecewise polynomial interpolation, and cubic spline interpolation is a type of spline interpolation that uses cubic piecewise polynomials. Thus, given the pixel values from 0F, 2F, 4F and 6F cubic spline interpolation can be used to generate a predicted value for pixel at 3F by fitting cubic piecewise polynomials. Such a cubic spline interpolation can be implemented with any suitable technique. It should be noted that other techniques could also be used, including other interpolation techniques and averaging techniques.

The technique for determining an intraframe pixel prediction value for the replacement pixel illustrated in FIG. 3 is particularly applicable for use in deinterlacing video with relatively low motion content. As described above, it may be desirable to provide other modes that use more computationally intensive methods than for use deinterlacing video with relatively high motion content.

Returning to FIG. 2, in another embodiment step 202 can be performed by first generating prediction scores, and then selecting a kernel of pixels using the prediction scores, with the selected kernel of pixel values used to generate the intraframe pixel prediction value. In this embodiment the prediction scores can be indicative of a direction of motion occurring in the video around the pixel, and thus can be used to select an intraframe prediction value based at least in part on that motion direction. As a specific example, the prediction score having the lowest score can be selected and used to select the intraframe pixel prediction value. Such embodiments are more computationally intensive but can provide significantly improved video quality when deinterlacing video with high motion content.

In one specific embodiment, the intraframe pixel prediction value is determined by calculating a plurality of prediction scores using differences in pixel pair values from each of a first plurality of kernels of pixel values, where the pixel pair values correspond to pixel pairs aligned in different directions such that each of pixel plurality of prediction scores is indicative of motion in a corresponding direction.

Figure 4A:
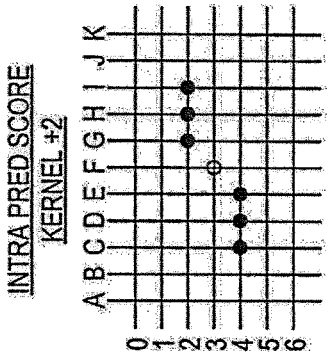
FIGS. 4A and 4B are schematic diagrams of a first plurality of kernels of pixel values in accordance with an embodiment described herein.
Figure 4A:
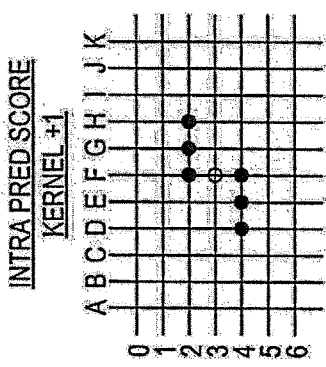
Figure 4A:
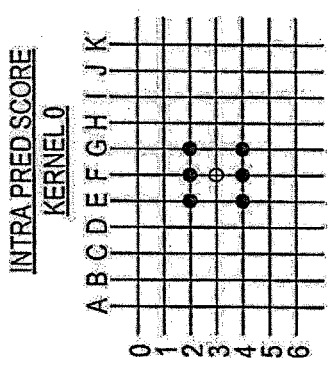
Figure 4A:
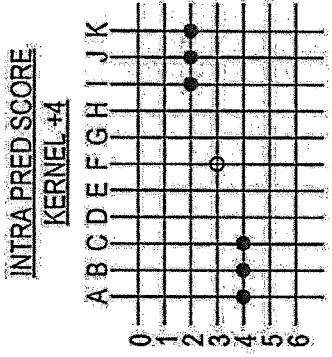
Figure 4A:
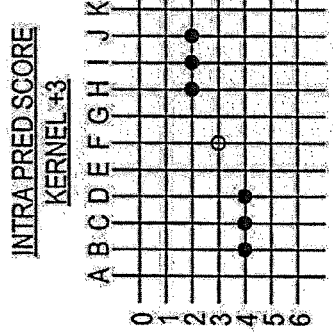
Figure 4B:
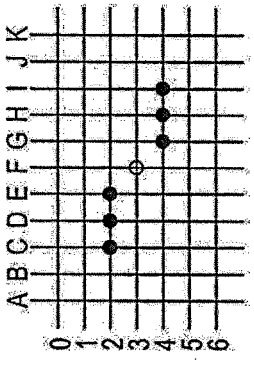
Figure 4B:
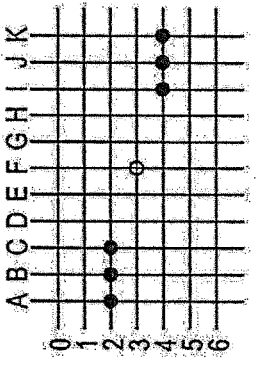
Figure 4B:
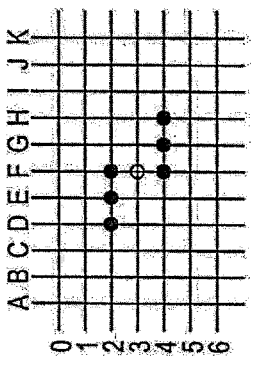
Figure 4B:
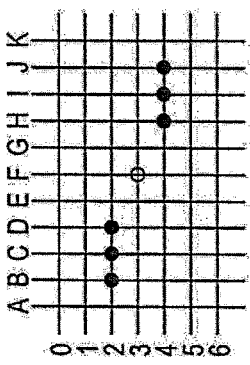

Turning now to FIGS. 4A and 4B, an example of a first plurality of kernels of pixel values 400 is illustrated. In this example, the first plurality of kernels of pixel values 400 includes nine kernels (labeled as Intra Pred Score Kernels −4, −3, −2, −1, 0, 1, 2, 3, 4). Each of these kernels of pixel values has two sets of pixels, with one above and below, and the two sets of pixels arranged in different directions. Each of the kernels of pixel values can be used to generate a corresponding prediction score, where the prediction score is indicative of the amount of motion in the corresponding direction. Thus, each kernel of pixel values can be used to select a kernel for intraframe prediction based at least in part on that motion direction.

In this illustrated example, each of the plurality of kernels of pixel values 400 is used to generate a prediction score for the pixel at 3F. And in this illustrated example, each of the first plurality of kernels of pixel values 400 includes six pixel values, with three pixel values in the line above 3F and three pixel values in the line below 3F. The three pixel values in the lines above and below are shifted in relative position over the different kernels.

For example, Intra Pred Score Kernel 0 includes pixel values 2E, 2F, 2G, 4E, 4F, and 4G. Notably, the pixel values correspond to the pixels directly above the pixel 3F. The Intra Pred Score Kernel +1 includes pixel values 2F, 2G, 2H, 4D, 4E, and 4F, and thus the pixels above are shifted one to the right, while the pixels below are shifted one to the left. This shifting continues, with Intra Pred Score Kernel +4 including pixel values where the pixels above are shifted four to the right, while the pixels below are shifted four to the left. Finally, Intra Pred Score Kernels −1 to −4 are similarly shifted, but in opposite directions with the pixels above shifted left and the pixels below shifted right.

As described above, each of these kernels of pixel values 400 can be used to generate a prediction score using differences in pixel pair values from each of a first plurality of kernels of pixel values, where the pixel pair values correspond to pixel pairs in aligned in different directions, such that each of pixel plurality of prediction scores is indicative of motion in a corresponding direction. In one example, the prediction scores can be generated by determining the difference between corresponding pairs of pixels and summing the absolute values of those differences. In this example the prediction scores for the kernels for pixel value 3F can be defined as:

$$\text{Score } 0 = \text{ABS}(2E - 4E) + \text{ABS}(2F - 4F) + \text{ABS}(2G - 4G)$$

$$\text{Score } + 1 = \text{ABS}(2F - 4D) + \text{ABS}(2G - 4E) + \text{ABS}(2H - 4F)$$

$$\text{Score } + 2 = \text{ABS}(2G - 4C) + \text{ABS}(2H - 4D) + \text{ABS}(2I - 4E)$$

$$\text{Score } + 3 = \text{ABS}(2H - 4B) + \text{ABS}(2I - 4C) + \text{ABS}(2J - 4D)$$

$$\text{Score } + 4 = \text{ABS}(2I - 4A) + \text{ABS}(2J - 4B) + \text{ABS}(2K - 4C)$$

$$\text{Score } - 1 = \text{ABS}(2D - 4F) + \text{ABS}(2E - 4G) + \text{ABS}(2F - 4H)$$

$$\text{Score } - 2 = \text{ABS}(2C - 4G) + \text{ABS}(2D - 4H) + \text{ABS}(2E - 4I)$$

$$\text{Score } - 3 = \text{ABS}(2B - 4H) + \text{ABS}(2C - 4I) + \text{ABS}(2D - 4J)$$

$$\text{Score } - 4 = \text{ABS}(2A - 4I) + \text{ABS}(2B - 4J) + \text{ABS}(2C - 4K)$$

Again, this is just one example of how the various prediction scores can be generated.

In one embodiment the scores are calculated as illustrated in FIGS. 4A and 4B and the minimum score is identified to determine the direction of motion in the interlaced video at the pixel in question. Thus, the minimum score value is used to identify the direction of motion and the kernel of pixels that will be used for determining the intraframe prediction values.

In one embodiment, a search for a local minimum among a plurality of prediction scores is performed. Such a search can reduce the total number of calculations performed to identify the lowest score because the score calculations are stopped when a local minimum is identified. For example, in such an embodiment the prediction scores for the positive kernels would be calculated in increasing order (0, +1, +2, +3, +4) until an increase in score is seen, indicating that the preceding score was a local minimum. The prediction scores for the negative kernels would then be calculated in decreasing order (0, −1, −2, −3, −4) until a second increase in score is seen, again indicating that the preceding score was again a local minimum. The lower of the two local minimums will then be the lowest score and can be used to identify the direction motion in the video at the pixel and thus identify the kernel of pixels that should be selected and used to generate the intraframe pixel prediction value.

Figure 5A:
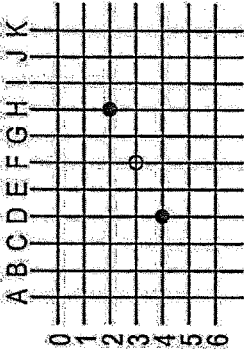
FIGS. 5A and 5B are schematic diagrams of a second plurality of kernels of pixel values in accordance with an embodiment described herein.
Figure 5A:
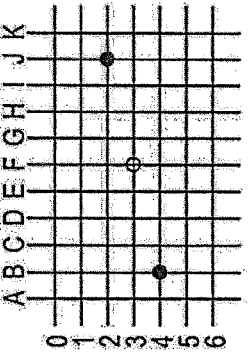
Figure 5A:
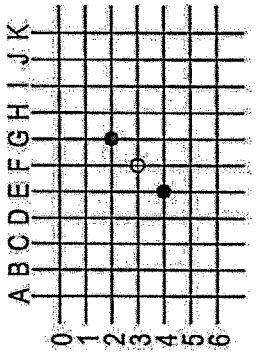
Figure 5A:
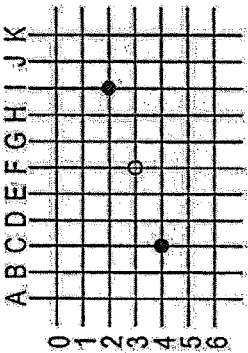
Figure 5A:
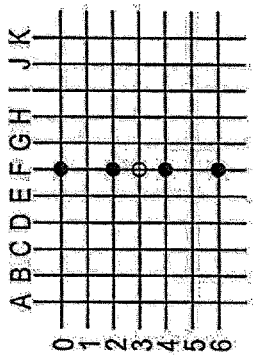
Figure 5B:
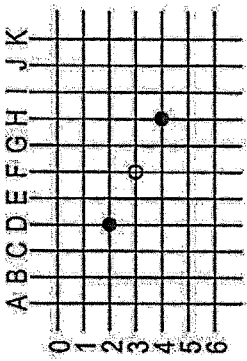
Figure 5B:
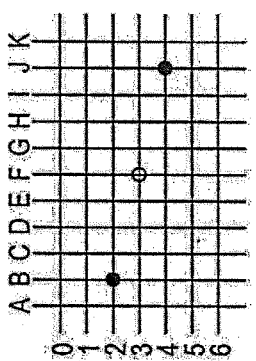
Figure 5B:
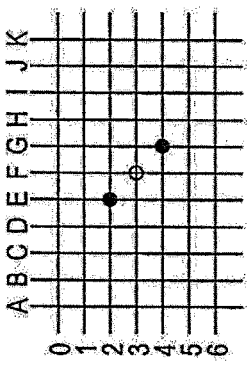
Figure 5B:
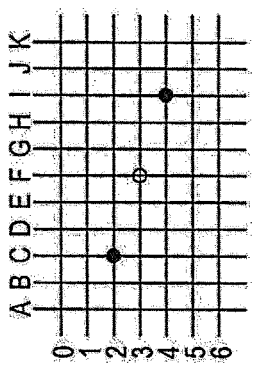

Turning now to FIGS. 5A and 5B, an example of a second plurality of kernels of pixel values 500 is illustrated. In this example, the second plurality of kernels of pixel values 500 includes nine kernels (labeled as Intra Pred Value Kernels −4, −3, −2, −1, 0, 1, 2, 3, 4). Each of the kernels of pixel values can be used to generate a corresponding intraframe pixel prediction value. Specifically, a kernel of the second plurality of kernels of pixels values 500 is selected that corresponds to motion in the video determined from first plurality of kernels of pixel values (e.g., the one with the lowest score).

In this illustrated example, each of the second plurality of kernels of pixel values 500 is used to generate an intraframe pixel prediction value for the pixel at 3F. And in this illustrated example, the first kernel (Intra Pred Value Kernel 0) includes four pixel values, and the remaining kernels (Intra Pred Value Kernel +1, +2, +3, +4, −1, −2, −3, −4) each includes two pixel values. Notably, the Intra Pred Value Kernel 0 is functionally the same as kernel 300 discussed above, and is used when Intra Pred Score Kernel 0 had the lowest prediction score and thus corresponds to a situation where relatively low motion exists at pixel 3F.

The remaining pixel kernels (Intra Pred Value Kernels +1, +2, +3, +4, −1, −2, −3, −4) in the second plurality of kernels of pixel values each include two pixel values, with the two pixel values on opposite positions relative to the pixel 3F but at different angles and distances. In this example, Intra Pred Value Kernel +1 includes pixel values 2G and 4E. The Intra Pred Score Kernel +2 includes pixel values 2H and 2D, and thus the pixel above is shifted one to the right, while the pixel below is shifted one to the left. Finally, Intra Pred Value Kernels −1 to −4 are similarly shifted, but in opposite directions with the pixels above shifted left and the pixels below shifted right.

As described above, each of these kernels of pixel values 500 can be used to generate an intraframe pixel prediction value. In one example, when the lowest prediction score corresponds to Intra Frame Value Kernel 0, a cubic spline interpolation of the kernel of pixel values is used to generate the intraframe pixel prediction value from that kernel of pixels. Thus, a cubic spline interpolation of the pixel values from 0F, 2F, 4F and 6F can be used to generate the intraframe pixel prediction value for the pixel at 3F. It should be noted that other techniques could also be used, including other kernel configurations and other interpolation techniques and averaging techniques.

Likewise, when the lowest prediction score corresponds to one of the Intra Frame Value Kernels +1, +2, +3, +4, −1, −2, −3, −4, an averaging technique can be used to calculate the intraframe pixel prediction value. Thus, in this example, the intraframe pixel prediction value for pixel 3F can be defined as:

$$\text{Intra Pred Value } 0 = \text{Cubic Spline Interpolation of } (0F, 2F, 4F, 6F)$$
$$\text{Intra Pred Value} + 1 = AVG(2G, 4E)$$
$$\text{Intra Pred Value} + 2 = AVG(2H, 4D)$$
$$\text{Intra Pred Value} + 3 = AVG(2I, 4C)$$
$$\text{Intra Pred Value} + 4 = AVG(2J, 4B)$$
$$\text{Intra Pred Value} - 1 = AVG(2E, 4G)$$
$$\text{Intra Pred Value} - 2 = AVG(2D, 4H)$$
$$\text{Intra Pred Value} - 3 = AVG(2C, 4I)$$
$$\text{Intra Pred Value} - 4 = AVG(2B, 4J)$$

Again, this is just one example of how the various intraframe pixel prediction values can be generated. For example, other kernel configurations, other interpolation techniques and averaging techniques could be used.

Again, the technique for determining an intraframe pixel prediction value for the replacement pixel illustrated in FIGS. 4A, 4B, 5A and 5B is more computationally intensive than that illustrated in FIG. 3. However, this technique is also useful for deinterlacing video with relatively high motion content. As described above, it may be desirable to use such computationally intensive methods when the interlaced video has relatively high motion content.

Returning to FIG. 2, the next step 204 is to determine an interframe pixel prediction value for the replacement pixel. As was noted above, a variety of techniques can be used to determine the interframe pixel prediction values. In general, the interframe pixel prediction values can be generated using at least one pixel value from at least two different frames (e.g., a previous frame and the current frame). Thus, the interframe pixel prediction values provide a measure of pixel changes over time.

In one specific embodiment, the determining the interframe pixel prediction value comprises determining a median of a previous frame pixel value, a current frame pixel value, and an average of a plurality of current frame pixel values. In this embodiment the interframe pixel prediction value can then be selected based on the determined median. In such an embodiment the interframe pixel prediction value can be determined by performing a cubic spline interpolation on a kernel of pixel values from the first field responsive to the average of the plurality of current frame pixel values being the determined median.

Figure 6:
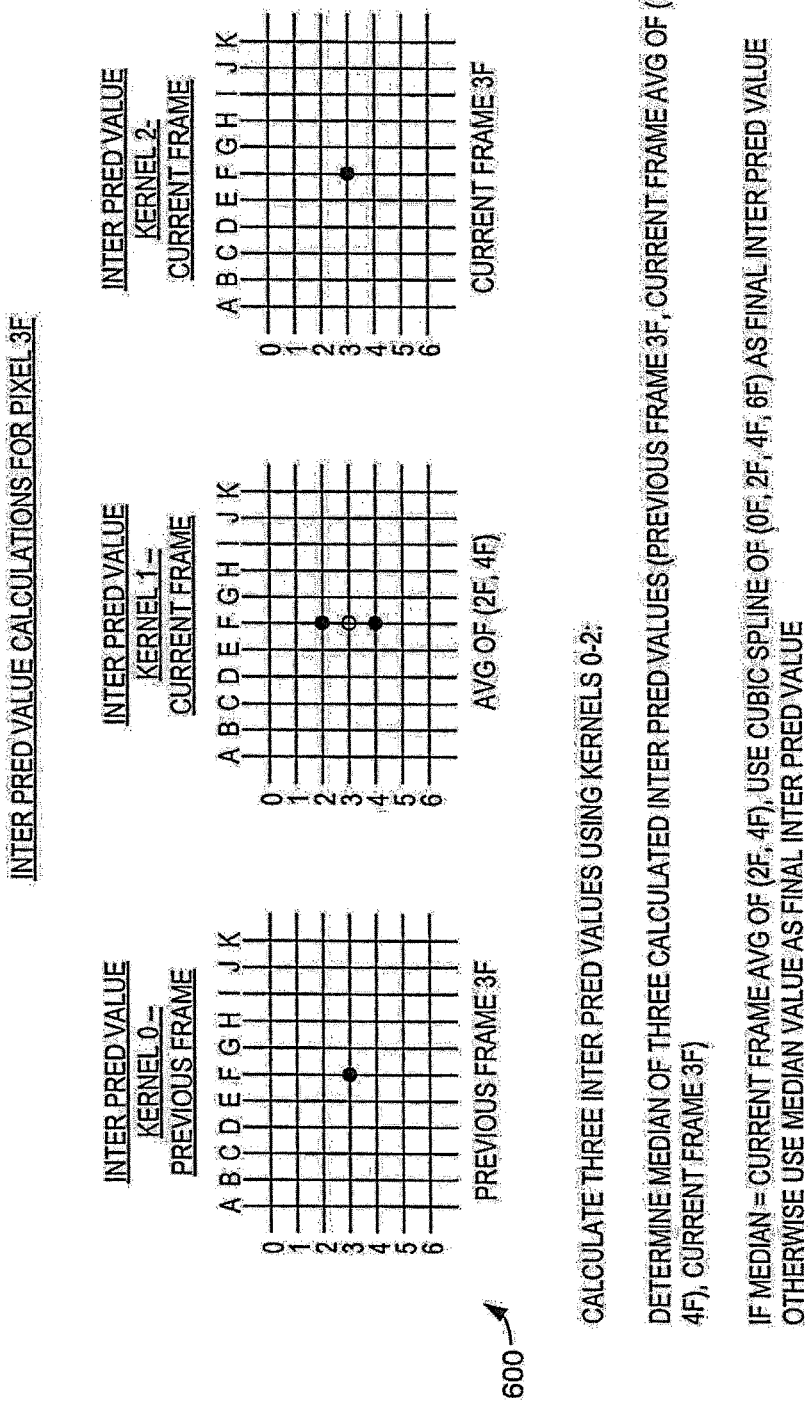
FIG. 6 is a schematic diagram of a third plurality of kernels of pixel values in accordance with an embodiment described herein.

Turning now to FIG. 6, an example of a third plurality of kernels of pixel values 600 that can be used to generate interframe pixel prediction values is illustrated. In this example, the third plurality of kernels of pixel values 600 includes three kernels (labeled as Inter Pred Value Kernels 0, 1, 2) that are used together to generate an interframe pixel prediction value for the pixel 3F.

The Inter Pred Value Kernel 0 is from the previous interlaced video frame. The Inter Pred Value Kernels 1 and 2 are taken from the current interlaced frame. Thus, prediction values generated from these kernels are interframe pixel prediction values that use at least one value from another frame.

Specifically, Inter Pred Value Kernel 0 uses the pixel value from the same pixel (i.e., 3F in this example) but from the previous frame, Inter Pred Value Kernel 1 uses the average of the pixel values from directly above and below the pixel being replaced in the current frame, and the Inter Pred Value Kernel 2 uses the pixel value from the same pixel in current frame.

Thus, in this example, the Inter Pred Values for the pixel 3F can be defined as:
Inter Pred Value 0=Value of 3F pixel from Previous Frame
Inter Pred Value 1=AVG (2F, 4F) from Current Frame
Inter Pred Value 2=Value of 3F pixel from Current Frame In this embodiment these three inter pred values are calculated from the three kernels, and these three values are used to determine the final interframe pixel prediction value. For example, the median of the three values can be determined and used to select the final interframe pixel prediction value. Specifically, if the Inter Pred Value 0 or Inter Pred Value 2 are the median value, then that value is used as the final interframe pixel prediction value. If Inter Pred Value 1 is the median value, then the interframe pixel prediction value can be determined as the cubic spline interpolation of pixels 0F, 2F, 4F and 6F.

Again, it should be noted that this is just one example, and that other techniques and combinations can be used to generate the interframe pixel prediction value.

Returning to FIG. 2, the next step 206 is to determine a pixel motion value for the replacement pixel value. As was described above, the blending of intraframe pixel prediction values and interframe pixel prediction values is based at least in part on estimations of motion strength in the video about the pixel being replaced. For example, in one embodiment a motion strength value is generated and used to determine the percentages of interframe prediction value and intraframe prediction value used in determining a replacement pixel value. In such an embodiment motion strength value can be determined at least in part based on pixel pairs from a previous frame, a current frame, and a next frame. In one specific embodiment the difference of averages of these pixel pairs can be used to generate the motion strength value.

Figure 7:
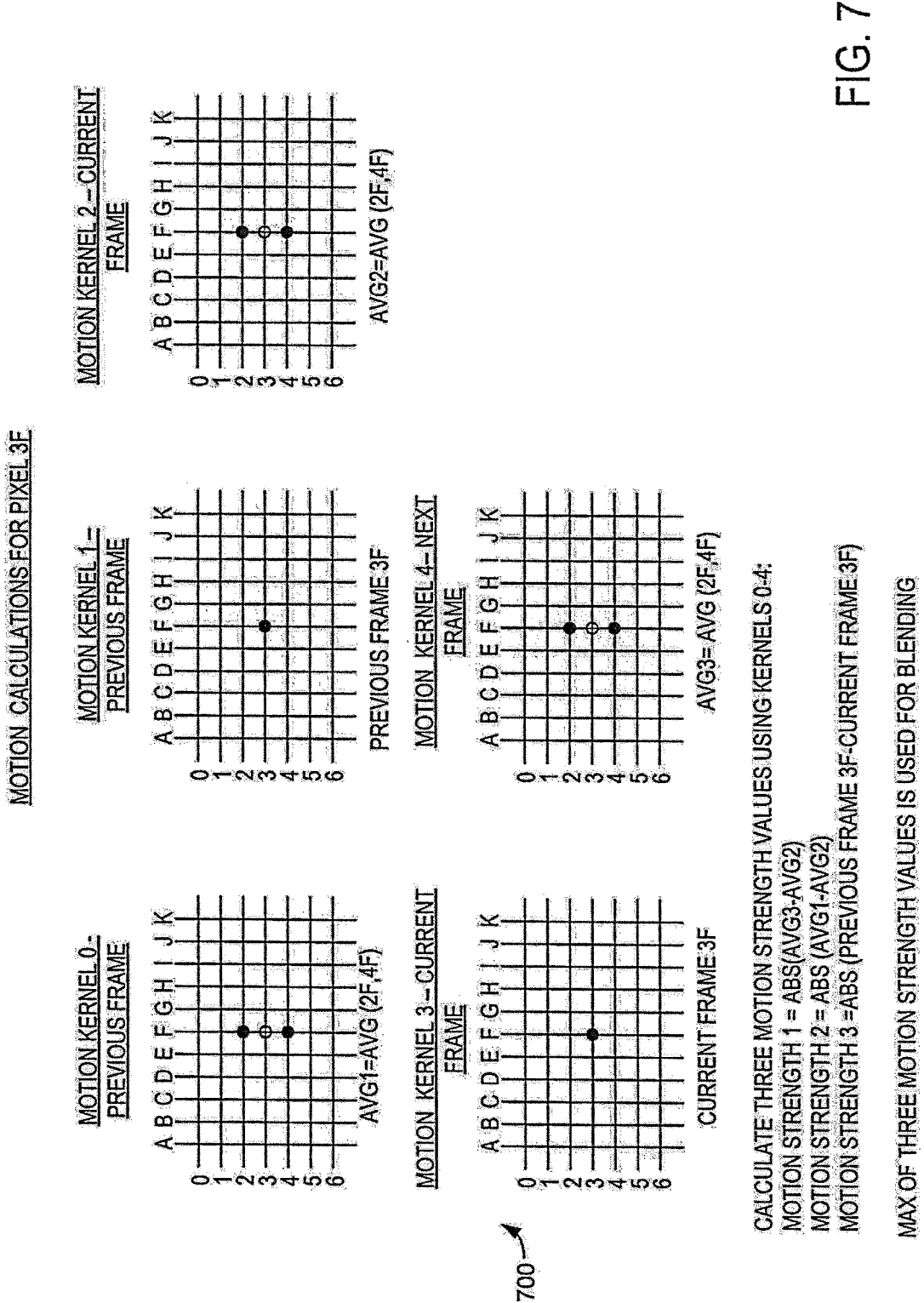
FIG. 7 is a schematic diagram of a fourth plurality of kernels of pixel values in accordance with an embodiment described herein.

Turning now to FIG. 7, an example of a fourth plurality of kernels of pixel values 700 that can be used to generate motion strength values is illustrated. In this illustrated example, the fourth plurality of kernels of pixel values 700 includes five kernels (labeled as Motion Kernel 0, 1, 2, 3, 4) that are used together to generate a motion strength value for the pixel 3F.

The Motion Kernels 0 and 1 are taken from the previous interlaced video frame. The Motion Kernels 2 and 3 are taken from the current interlaced video frame. Finally, the Motion Kernel 4 is taken from the next interlaced video frame. In this embodiment intermediate values are determined from the five kernels, and these intermediate values are used to generate three motion strength values. The maximum of the three motion strength values is then selected as the final motion strength value that is used for blending.

Specifically, for the Motion Kernel 0, the average of the pixel values from directly above and directly below the pixel being replaced, but from the previous frame provides the first intermediate value. For Motion Kernel 1, the pixel value from the same pixel (i.e., 3F in this example) but from the previous frame provides the second intermediate value. For Motion Kernel 2, the average of the pixel values from directly above and directly below the pixel being replaced, from the current frame provides the third intermediate value. For Motion Kernel 3, the pixel value from the same pixel (i.e., 3F in this example), from the previous frame, provides the fifth intermediate value. Finally, for Motion Kernel 4, the average of the pixel values from directly above and directly below the pixel being replaced, but from the next frame provides the fifth intermediate value.

Thus, in this example, the intermediate values for the pixel 3F can be defined as:

Intermediate Value $0 = AVG1 = AVG(2F, 4F)$ from Previous Frame

Intermediate Value 1 = Value of $3F$ pixel from Previous Frame

Intermediate Value $2 = AVG2 = AVG(2F, 4F)$ from Current Frame

Intermediate Value 3 = Value of $3F$ pixel from Current Frame

Intermediate Value $4 = AVG3 = AVG(2F, 4F)$ from Next Frame

In this embodiment these five intermediate values are calculated from the five kernels, and these five intermediate values are used to determine the three Motion Strength Values. The maximum of these three motion strength values can be determined and used as the final motion strength value for blending.

In this example, the motion strength values for the pixel 3F can be defined as:

Motion Strength Value 0 = ABS($AVG3 - AVG2$)

Motion Strength Value 1 = ABS($AVG1 - AVG2$)

Motion Strength Value 2 = ABS(Previous Frame $3F$ – Current Frame $3F$)

The maximum of these three motion strength values can be determined and used as the final motion strength value for blending. Again, it should be noted that this is just one example, and that other techniques and combinations can be used to generate the interframe pixel prediction value.

Returning to FIG. 2, the next step 208 is to determine a final replacement pixel value based on a blending of the intraframe pixel prediction value and the interframe pixel prediction value. As was described above, the blending of intraframe pixel prediction values and interframe pixel prediction values is based at least in part on the motion strength value that is generated and used to determine the percentages of interframe prediction value and intraframe prediction value used in determining a replacement pixel value.

In one embodiment the motion strength value is used to determine a blending factor that is used in blending the intraframe pixel prediction values and interframe pixel prediction values. For example, the blending factor can be determined by comparing the motion strength value to one or more threshold values. Specifically, the blending factor can be based in part on the motion strength value when the motion strength value is between the threshold values, and can be set to constant values (e.g., 1 or 0) when beyond the threshold values. The blending factor can then be used to generate the replacement pixel value that is copied to the new progressive scan frame.

Figure 8:
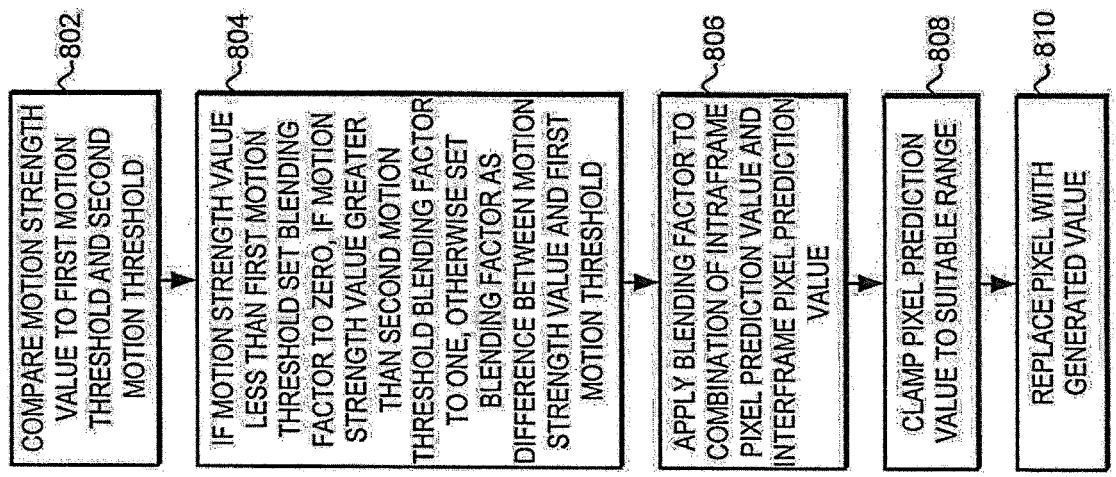
FIG. 8 is a flowchart showing a method for generating replacement pixel values in accordance with the embodiments described herein.

Turning now to FIG. 8, a method 800 for determining a replacement pixel value based on a blending factor is illustrated. This method 800 is thus an example of how a final replacement pixel value can be determined (e.g., step 208 in method 200). In this method the final pixel replacement value is determined based on a blending of the interframe pixel prediction value and intraframe pixel prediction value. The method 800 is thus an example of the type of methods that can be performed by a deinterlacer (e.g., deinterlacer 108 of FIG. 1) in accordance with the embodiments described herein.

The first step 802 of method 800 is to compare the motion strength value to a first motion threshold and a second motion threshold. As was described above, the motion strength value is a measure of motion in the video about the pixel, and can be determined at least in part based on pixel pairs from a previous frame, a current frame, and a next frame.

In general, the motion thresholds are used to determine when blending of the interframe and intraframe prediction values is to be performed. Thus, the first motion threshold is set to a value that corresponds to a level where motion of the video is low enough that the intraframe pixel prediction value should be used. Likewise, the second motion threshold is set to a value that corresponds to a level where the motion of the video is high enough that the interframe pixel prediction value should be used.

The next step 804 is to set the blending factor to zero if the motion strength value is less than a first threshold, set the blending factor to one if the motion strength value is greater than the second threshold, or otherwise set the blending factor to the difference between the motion strength value and the first motion threshold. In some embodiments it may also be desirable to apply a step value to the blending factor to limit the blending factor to a selected group of discrete values. For example, the blending factor can be set to 0.2 increment values. Again, this is just one example of how a blending factor can be generated from the motion strength value and one or more threshold values.

The next step 806 is to apply the blending factor to the combination of intraframe pixel prediction value and interframe pixel value to generate a blended pixel prediction value. In one embodiment the intraframe pixel prediction value is multiplied by the blending factor and the interframe pixel prediction value is multiplied by one minus the blending factor. The result is then added together to generate the blended pixel prediction value. Of course, this is just one example of how the blending factor can be applied to the intraframe and interframe prediction values to generate a replacement pixel value.

The next step 808 is then to clamp the result to a suitable range. The blended pixel prediction value is clamped to assure the value is within a suitable range for pixel values. For example, for 8-bit video the pixel values can be clamped to be between 16 and 235 or between 16 and 255, depending upon the video encoding technique used.

The next step 810 is to replace the pixel with the generated value. This step copies the replacement pixel value into the appropriate location in the new progressive scan frame that is being generated.

As was described above, the method 800 would typically be performed for all or part of pixels from one field of the interlaced video to generate progressive scan video. For example, the pixel values from the top field (e.g., the even lines) or a bottom field (e.g., the odd lines) can be copied to corresponding lines in the new progressive scan frame. Replacement pixel values for the remaining lines of the new progressive scan frame are then generated using the method 800. The result is a complete frame of pixels, where the frame includes the lines of pixels for display in progressive scan while providing good video quality. This process would then be repeated for each new progressive scan frame that is generated for the video. It should again be noted that it may not be desirable to perform method 800 for new pixels being generated for each progressive scan frame. For example, in some cases it may be desirable to use simplified methods to generate replacement pixel values for pixels near the outer perimeter of the frame.

Benefits, other advantages, and solutions to problems have been described herein regarding specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Moreover, where a phrase similar to "at least one of A, B, or C" is used, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. The exclusive or is intended only where the term "or" is used in conjunction with a term or phrase indicating exclusivity such as, for example, "either" or "only one of."

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant arts how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An automated process for converting an interlaced video to a progressive scan video, the automated process comprising:
   copying a first plurality of pixel values from a first field of a first frame of the interlaced video to a new progressive scan frame;
   determining intraframe prediction values and interframe prediction values for a second plurality of pixels in a second field of the first frame of the interlaced video; and
   blending the interframe prediction values and the intraframe prediction values to generate a plurality of replacement pixel values for the new progressive scan frame.

2. The automated process of claim 1, wherein blending the interframe prediction values and the intraframe prediction values further comprises:
   determining a motion strength value; and
   determining, using the motion strength value, percentages of interframe prediction values and the intraframe prediction values for blending.

3. The automated process of claim 1, wherein the replacement pixel values are generated using steps comprising:
   determining a motion strength value based at least in part on a first difference and a second difference, wherein the first difference is between an average of pixel values for a first pixel pair in a previous frame and a second pixel pair in a current frame, and wherein the second difference is between an average of pixel values for a third pixel pair in a next frame and the second pixel pair in the current frame.

4. The automated process of claim 1, wherein blending the interframe prediction values and the intraframe prediction values to generate the plurality of replacement pixel values comprises:
   determining a motion strength value; and
   determining a blending factor based on the motion strength value in response to the motion strength value being between a first threshold value and a second threshold value.

5. The automated process of claim 1, wherein blending the interframe prediction values and the intraframe prediction values to generate the plurality of replacement pixel values comprises:
   determining a motion strength value; and
   setting a blending factor to zero in response to the motion strength value exceeding a threshold.

6. The automated process of claim 1, wherein blending the interframe prediction values and the intraframe prediction values to generate the plurality of replacement pixel values comprises:
   determining a motion strength value; and
   setting a blending factor to one in response to the motion strength value exceeding a threshold.

7. The automated process of claim 1, wherein the blending the interframe prediction values and the intraframe prediction values to generate the plurality of replacement pixel values comprises:
   clamping the replacement pixel values within a range of acceptable values.

8. The automated process of claim 1, wherein blending the interframe prediction values and the intraframe prediction values comprises:
   interpolating a kernel of pixel values from the first field.

9. The automated process of claim 1, wherein determining the intraframe prediction values comprises:
   performing a cubic spline interpolation on a kernel of pixel values from the first field.

10. The automated process of claim 1, wherein determining the intraframe prediction values comprises:
    performing a cubic spline interpolation on a kernel of pixel values from the first field, where the kernel of pixel values includes two pixels above and two pixels below each pixel.

11. The automated process of claim 1, wherein determining the intraframe prediction values comprises:
    calculating a plurality of prediction scores using a first plurality of kernels of pixel values, wherein each prediction score from the plurality of prediction scores indicates motion in a direction.

12. The automated process of claim 11, wherein determining the intraframe prediction values comprises:
    calculating the intraframe prediction values using a kernel of pixel values selected based on the plurality of prediction scores.

13. The automated process of claim 1, wherein determining the intraframe prediction values comprises:
    searching for a local minimum among a plurality of prediction scores using a first plurality of kernels of pixel values, wherein each prediction score from the plurality of prediction scores indicates motion in a direction; and
    calculating the intraframe prediction values from a kernel of pixel values selected from a second plurality of kernels of pixel values, wherein the selected kernel of pixel values corresponds to the local minimum among the plurality of prediction scores.

14. The automated process of claim 1, wherein determining the intraframe prediction values comprises:
    calculating a plurality of prediction scores using differences in pixel pair values from each of a first plurality of kernels of pixel values, wherein the pixel pair values correspond to pixel pairs, wherein each prediction score from the plurality of prediction scores indicates of motion in direction of alignment of the corresponding pixel pair;
    selecting a kernel of pixel values from a second plurality of kernels of pixel values based on the plurality of prediction scores; and
    calculating the intraframe prediction values using an average of the selected kernel of pixel values.

15. The automated process of claim 1, wherein determining the interframe prediction values comprises:
    determining the interframe prediction values from at least one pixel value from a different frame.

16. The automated process of claim 1, wherein determining the interframe prediction values comprises:
    determining a median of a previous frame pixel value, a current frame pixel value, and an average of a plurality of current frame pixel values, and selecting an interframe prediction value based on the median.

17. An automated process comprising:
    receiving an interlaced video comprising interlaced frames, wherein an interlaced frame includes a first field and a second field separated in time;
    copying a first plurality of pixel values from the first field of the interlaced frame to a new progressive scan frame;
    determining intraframe prediction values and interframe prediction values for a second plurality of pixels in the second field of the interlaced frame; and
    blending the interframe prediction values and the intraframe prediction values to generate a plurality of replacement pixel values for the new progressive scan frame.

18. The automated process of claim 17, wherein blending the interframe prediction values and the intraframe prediction values to generate the plurality of replacement pixel values comprises:
    determining a motion strength value; and
    determining, using the motion strength value, percentages of interframe prediction values and the intraframe prediction values for blending.

19. A streaming server in electronic communication with a playback device, the streaming server comprising a processor and a non-transitory memory configured to store instructions that, when executed by the processor, cause the streaming server to perform operations, the operations comprising:
    copying a first plurality of pixel values from a first field of a first frame of an interlaced video to a new progressive scan frame;
    determining intraframe prediction values and interframe prediction values for a second plurality of pixels in a second field of the first frame of the interlaced video; and blending the interframe prediction values and the intraframe prediction values to generate a plurality of replacement pixel values for the new progressive scan frame.

20. The streaming server of claim 19, wherein blending the interframe prediction values and the intraframe prediction values to generate the plurality of replacement pixel values comprises:
   determining a motion strength value; and
   determining, using the motion strength value, percentages of interframe prediction values and the intraframe prediction values for blending.

* * * * *